US008342553B2

(12) United States Patent
Patterson

(10) Patent No.: US 8,342,553 B2
(45) Date of Patent: Jan. 1, 2013

(54) MOUNTING METHOD FOR BOTTOM BRACKET PLANETARY

(75) Inventor: Sam Patterson, DeLeon Springs, FL (US)

(73) Assignee: Patterson Bicycle Transmission LLC, DeLeon Springs, FL (US)

( * ) Notice: Subject to any disclaimer, the term of this patent is extended or adjusted under 35 U.S.C. 154(b) by 109 days.

(21) Appl. No.: 12/785,402

(22) Filed: May 21, 2010

(65) Prior Publication Data
US 2010/0301581 A1 Dec. 2, 2010

Related U.S. Application Data

(60) Provisional application No. 61/217,061, filed on May 27, 2009.

(51) Int. Cl.
*B62M 11/00* (2006.01)
(52) U.S. Cl. ............ 280/260; 74/417; 280/259; 475/12; 475/269; 475/307
(58) Field of Classification Search ............. 74/417; 280/259, 260; 475/12, 269, 307
See application file for complete search history.

(56) References Cited

U.S. PATENT DOCUMENTS

| | | | |
|---|---|---|---|
| 1,395,067 A | 10/1921 | Warren | |
| 2,189,220 A | 2/1940 | Osborne | |
| 3,893,206 A | 7/1975 | Pickles et al. | |
| 4,303,255 A | 12/1981 | Thomas | |
| 4,369,674 A | 1/1983 | Hamane et al. | |
| 4,610,644 A | 9/1986 | Nagano | |
| 4,854,191 A | 8/1989 | Nagano | |
| 4,936,597 A * | 6/1990 | Hartmann | 280/231 |
| 5,273,500 A | 12/1993 | Nagano | |
| 5,303,942 A | 4/1994 | Schlumpf | |
| 5,445,567 A | 8/1995 | Chattin | |
| 5,496,049 A | 3/1996 | Escobedo | |
| 5,609,071 A | 3/1997 | Schlumpf | |
| 5,620,384 A | 4/1997 | Kojima | |
| 5,887,318 A | 3/1999 | Nicoletti | |
| 5,895,336 A | 4/1999 | Yoo | |
| 5,961,409 A | 10/1999 | Ando | |

(Continued)

FOREIGN PATENT DOCUMENTS

EP 0159855 7/1989

(Continued)

OTHER PUBLICATIONS

International Search Report and Written Opinion for International Applicaiton No. PCT/08/07769, Dec. 1, 2008.

(Continued)

*Primary Examiner* — Lesley D Morris
*Assistant Examiner* — Jacob Knutson
(74) *Attorney, Agent, or Firm* — Clause Eight IPS; Michael Catania

(57) ABSTRACT

A mounting device for a bicycle having a bottom bracket planetary gear system with a sun gear or ring gear, and a bottom bracket shell positioned at the convergence of a plurality of frame parts of a bicycle frame is disclosed herein. The mounting device preferably has a control plate, a drive side bearing flange, a control input and control pawl. The control pawl blocks the sun gear, ring gear or planet carrier of the planetary system of the bicycle transmission thereby transferring the sun gear, ring gear or planet carrier force to the control pawl then to the control plate and then to the bicycle frame.

20 Claims, 18 Drawing Sheets

U.S. PATENT DOCUMENTS

| | | |
|---|---|---|
| 6,029,990 A | 2/2000 | Busby |
| 6,079,726 A | 6/2000 | Busby |
| 6,123,639 A | 9/2000 | Schlumpf |
| 6,155,585 A | 12/2000 | Busby |
| 6,173,982 B1 | 1/2001 | Westergard |
| 6,267,704 B1 | 7/2001 | Patterson |
| 6,325,739 B1 | 12/2001 | Hino |
| 6,361,461 B1 | 3/2002 | Pusic |
| 6,478,710 B1 | 11/2002 | Steuer et al. |
| 6,533,700 B2 | 3/2003 | Shoge |
| 6,540,244 B1 | 4/2003 | Oda |
| 6,558,288 B2 | 5/2003 | Okochi |
| 6,572,508 B2 | 6/2003 | Shoge |
| 6,607,457 B2 | 8/2003 | Kawakami |
| 6,607,465 B1 | 8/2003 | Shoge |
| 6,640,938 B2 * | 11/2003 | Shoge ................ 188/24.11 |
| 6,641,500 B2 | 11/2003 | Shoge |
| 6,692,400 B2 | 2/2004 | Butz |
| 6,726,587 B2 | 4/2004 | Kawakami |
| 6,764,423 B2 | 7/2004 | Lemanski |
| 6,860,171 B1 | 3/2005 | Nanko et al. |
| 6,875,150 B2 | 4/2005 | Matsuo et al. |
| 6,988,973 B2 | 1/2006 | Steuer |
| 7,083,542 B2 | 8/2006 | Itou et al. |
| 7,166,054 B2 | 1/2007 | Urabe |
| 7,192,379 B2 | 3/2007 | Steuer et al. |
| 7,472,626 B2 | 1/2009 | Nanko et al. |
| 7,712,566 B2 | 5/2010 | Jordan et al. |
| 2003/0064840 A1 | 4/2003 | Kawakami |
| 2003/0064841 A1 | 4/2003 | Kawakami |
| 2003/0096669 A1 | 5/2003 | Kawakami |
| 2003/0186776 A1 | 10/2003 | Wu |
| 2004/0171454 A1 | 9/2004 | Itou et al. |
| 2004/0200307 A1 | 10/2004 | Mitchell |
| 2009/0260476 A1 | 10/2009 | Jordan et al. |

FOREIGN PATENT DOCUMENTS

| | | |
|---|---|---|
| EP | 0922630 | 6/2004 |
| EP | 1980484 | 10/2008 |
| EP | 2112062 | 10/2009 |
| EP | 1332958 | 12/2009 |
| WO | WO9946159 | 9/1999 |

OTHER PUBLICATIONS

International Search Report and Written Opinion for International Application PCT/US2010/035994, Apr. 1, 2011.

* cited by examiner

MOUNTING METHOD FOR BOTTOM BRACKET PLANETARY

CROSS REFERENCE TO RELATED APPLICATION

The Present Application claims priority to U.S. Provisional Patent No. 61/217,061, filed on May 27, 2009, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to bicycle transmissions. More specifically, the present invention relates to a system and method for mounting a bottom bracket bicycle planetary gear apparatus.

2. Description of the Related Art

The prior art discusses generating an overdrive condition by blocking a sun gear, inputting driving forces to the planet carrier and outputting through a ring gear at a rotational speed greater than the input speed. This is the overdrive condition.

The one to one or non overdrive condition is generated by locking either the sun gear or ring gear to the planet carrier so that the gearing rotates en-masse. In the overdrive condition, when the sun gear is blocked or prevented from rotating relative to the bike frame, a system for transferring the blocking torque from the sun gear to a control mechanism and from the control mechanism to the bike frame is required.

Various systems have been used to secure the control mechanism to the bike frame in devices which are known to the inventor. For example a torque arm can be secured to a frame member such as a chain stay by means of a strap. This system has been used by the Schlumpf "Speed Drive" and "Mountain Drive" bottom bracket planetary systems. The control mechanism can also be secured to the frame by means of brazeon tabs added to the bottom bracket shell for the purpose of mounting such things as chain guards. Such brazeon tabs may not have been added to the bike frame with the precision required for cooperation with a planetary control mechanism. In these cases, the brazeons and bottom bracket shell may require additional machining to bring them into correct relationship to the planetary control mechanism. For example, the Sram "Hammerschmidt" bottom bracket planetary system advises the customer to study an installation manual more than sixty pages long before attempting to install a Hammerschmidt to an unprepared bike frame. According to the installation manual, some frames may not be suitable for the application because the brazeon tabs, called ISCG (International Standard Chain Guard) tabs may not be located in the precise locations required by the Sram Hammerschmidt.

In general it is preferable to mount a bottom bracket planetary system to a standard bike frame with no special modifications or added brazeon tabs.

BRIEF SUMMARY OF THE INVENTION

The present invention is a mounting system that works on standard unmodified bike frames as manufactured from twenty years ago to today. In other words, substantially all standard bike frames made for sale in the U.S. and Europe for the last twenty years can utilize the present invention.

One aspect of the present invention is a mounting device for a bicycle having a bottom bracket planetary gear system with a sun gear or ring gear, and a bottom bracket shell positioned at the convergence of a plurality of frame parts of a bicycle frame. The mounting device comprises a control plate, a drive side bearing flange, a control input and control pawl. The control plate has a body comprising a central aperture, an annular wall, a first surface and a second surface. The annular wall has a torque fix feature for engaging one of the frame parts. The aperture extends through the body. The second surface is mounted against the bottom bracket shell. The drive side bearing flange is positioned through the central aperture of the body of the control plate and is positioned through an aperture of the bottom bracket shell through a first opening of the aperture. The control input is connected to the second surface of the body of the control plate. The control input is controlled by a control cable. The control pawl is connected to the first surface of the body of the control plate. The control pawl blocks the sun gear, ring gear or planet carrier of the planetary system of the bicycle transmission thereby transferring the sun gear, ring gear or planet carrier force to the control pawl then to the control plate and then to the bicycle frame.

The control plate is preferably composed of a material selected from stainless steel, titanium alloy, aluminum alloy, magnesium alloy and composite. The control plate preferably has a thickness ranging from 0.100 inches to 0.300 inches. The control plate preferably has a diameter ranging from 2 inches to 5 inches. The plurality of frame parts connecting to the bottom bracket preferably comprises a chain stay and a down tube. The plurality of frame parts of the frame alternatively comprises a chain stay, a down tube and a seat tube.

Another aspect of the present invention is a bicycle having a bottom bracket planetary system. The bicycle comprises a frame, a gear, a control plate, a drive side bearing flange, a control input and a control pawl. The frame comprises a plurality of frame parts converging at a bottom bracket shell. The bottom bracket shell has an aperture with a first opening and a second opening. The gear comprises one of a sun gear, a planet gear or a ring gear. The control plate has a body comprising a central aperture, an annular wall, a first surface and a second surface. The annular wall has a torque fix feature for engaging one of the frame parts. The aperture extends through the body. The second surface is mounted against the bottom bracket shell. The drive side bearing flange is positioned through the central aperture of the body of the control plate and is positioned through an aperture of the bottom bracket shell through a first opening of the aperture. The control input is connected to the second surface of the body of the control plate. The control input is controlled by a control cable. The control pawl is connected to the first surface of the body of the control plate. The control pawl blocks the sun gear, ring gear or planet carrier of the planetary system of the bicycle thereby transferring the sun gear, ring gear or planet carrier force to the control pawl then to the control plate and then to the bicycle frame.

The bicycle further comprises a handlebar connected to the frame. The handlebar has an actuator, and the control cable is connected to the actuator of the handlebar.

Yet another aspect of the present invention is a method for transferring blocking torque from a bicycle sun gear to a bicycle control mechanism and then to a bicycle frame. The method includes blocking a gear with a control pawl of a control plate mounted on a bottom bracket shell of a bicycle frame. The gear comprises one of a sun gear, a planet gear or a ring gear. The method also includes transferring a blocking force of the gear to the control pawl. The method also includes transferring the blocking force from the control pawl to the control plate. The method also includes transferring the blocking force from the control plate to the bicycle frame.

Yet another aspect of the present invention is a method of securing a control plate to a bicycle frame. The control plate is constrained to rotate about the bottom bracket spindle axis by means of contact forces against a drive side spindle bearing flange and the bottom bracket shell. The control plate is constrained not to rotate about the spindle axis by means of contact forces against a feature integral with the bottom bracket shell. The control plate supports a control element for the control of a planetary mechanism rotatably mounted on the spindle. The control element is used to block or unblock rotation of one of the sun gear, planet gear or ring gear. The control element is moveably mounted to the outboard face of the control plate and extends through the control plate to the inboard face of the control plate. The control element is preferably actuated by a control cable, rod, lever, hydraulic linkage, wired or wireless electromechanical linkage responding to a control input coming from the rider or from an automated controller such as a microprocessor.

Yet another aspect of the present invention is a method of securing a control plate with an integral control mechanism for the control of a planetary gear box. The control plate is held concentric and parallel to the planetary mechanism by means of axial and radial contact forces that exist in a first interface area that is essentially a body of revolution about the planetary axis. The control plate is prevented from rotating in the driving direction by means of tangential forces that exist in a second interface area that is essentially a plane which is parallel to the planetary axis and radially offset from the planetary axis.

Yet another aspect of the present invention is a method of securing a control plate with integral control mechanism for the control of a planetary gear box concentric to the pedal spindle using no additional fasteners but only sandwiching the control plate between modified versions of existing parts. The control plate is held concentric to and perpendicular to the pedal spindle by being sandwiched between the bottom bracket shell and the drive side bearing flange. The control plate is held from rotating in the driving direction by tangential forces between the control plate and one of the several features that normally exist as integral with the bottom bracket shell such as the chain stay, seat tube, down tube, or rear suspension boss.

Yet another aspect of the present invention is a method for mounting the rotating parts of a planetary on a spindle which is preassembled to the drive side crank when manufactured. The spindle has a parallel fit to both bottom bracket bearing inner races. A spacer or shoulder abuts the outboard face of the drive side bottom bracket bearing inner race to set the axial spacing between the crank and the bearing. The non drive side crank has a parallel spline fit to the spindle with a clamping system. Axial play in the system is eliminated by sliding the spindle axially as needed before clamping the parallel spline between the spindle and the non drive side crank.

Yet another aspect of the present invention is a method for mounting the rotating parts of a planetary system on a spindle. A ring gear shell is rotatably supported on the spindle by means of a ball, roller or plain bearing system substantially in the plane of the output sprocket to avoid cantilever forces on that bearing system due to drive chain tension.

The bearing system is preferably a layered system which permits a torque tube to pass through the bearing system. The torque tube transmits torque from the control mechanism through the bearing system to a sun gear. The torque tube transmits a blocking torque to prevent the sun gear from rotating relative to the frame to enable a drive ratio output from the planetary. Alternatively torque tube is permitted to turn freely thereby allowing the sun gear to rotate relative to the bike frame thereby enabling a second drive ratio output from the planetary.

Normally a hinge joint is formed by using gudgeon bores on two parts connected with a gudgeon pin that passes through all the bores to rotatably connect the hinge plates. The present system is novel in that there is no third piece. There is no gudgeon pin. Instead, a pintle is formed integrally on one part and a receiver gudgeon is formed integrally on the other part. This uniquely permits the hinge joint to be assembled axially and alleviates the need for a separate gudgeon pin. A return spring is employed which passes through a bore on one part and a slot on the other to trap the hinge together axially. In addition, the return spring biases the hinge joint in the desired overcenter relationship where the hinge can support columnar loading. In addition to that, the same return spring also biases the articulated pawl toward the ratchet wheel. This arrangement allows the two pawl elements to be largely two dimensional with the hinge joint having full contact across the axial dimension of the part (axial with respect to the pawl pivot and ratchet wheel axis of rotation which are parallel). This permits extreme economy of number of parts and greater wear area at the hinge joint.

Yet another aspect of the present invention is a ratchet wheel and pawl system. The pawl is articulated by means of a hinge joint connecting two pawl elements which are a base member and a blocker member. The articulated hinge joint is formed by a pintle and gudgeon which are integral to the respective pawl elements. The gudgeon encircles the pintle so as to trap it longitudinally. The gudgeon and pintle is preferably slidably assembled axially. A return spring is preferably inserted into bores or slots in the respective pawl elements after they are assembled axially. The return spring, after assembly, maintains the axial position of the respective pawl elements. The return spring biases the two pawl elements in an over center relationship relative to the hinge for supporting columnar loading. The return spring also biases the articulated pawl toward the ratchet wheel. The pawl base member is preferably rotatably mounted on a stationary pivot axle. The base member is preferably cam actuated. Alternatively, the base member can be mounted directly on a rotating control rod.

Additionally, the novel articulated pawl is provided with a camming lever projection which allows it to be rotated out of engagement with the ratchet wheel using a camming action. The camming force results from a specially configured cam lobe connected to the control rod. The configuration of the cam lobe modulates the mechanical advantage relationship between control rod rotation and pawl rotation. This way the mechanical advantage of the control rod over the pawl can be maximized to initiate the movement. The initiation is the most difficult phase of the pawl movement because of static friction forces and because the overcenter relationship at the pawl hinge is maximum. Once the pawl base member begins to rotate, the over center relationship is reduced and kinetic friction coefficients take over so that further movement requires far less camming force. In this phase of the pawl movement away from the ratchet wheel, the contact between the cam and the pawl base member moves away from the axis of rotation of the control rod and toward the axis of rotation of the pawl base member in order to complete the withdrawal rapidly.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
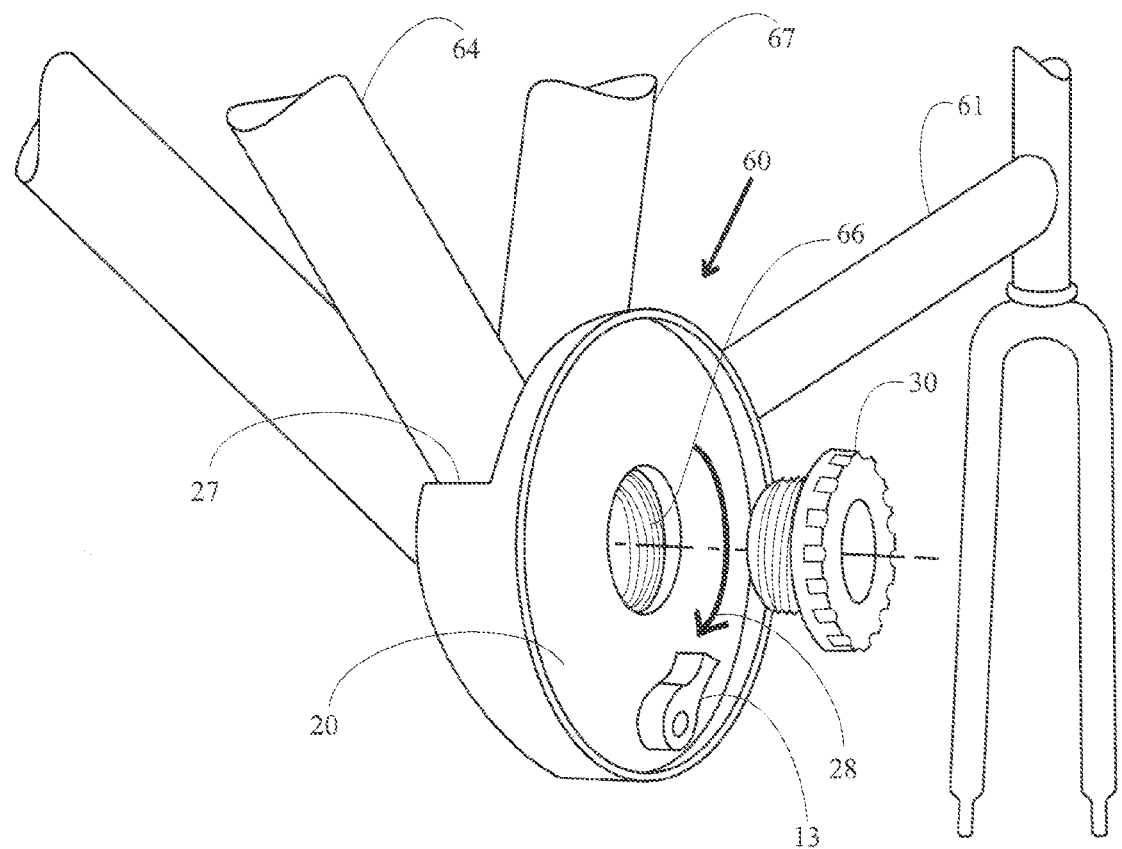
FIG. 1 is an outboard side view of a preferred embodiment of a bottom bracket mounting system for bicycle.

As shown in FIG. 1, a down tube 61, a seat tube 67 and chain stay 64 converge at a bottom bracket shell subassembly 60. The bottom bracket shell subassembly 60 is hidden behind a control plate 20. The internal threads 66 of an aperture 69 in the drive side end of the bottom bracket shell subassembly 60 are visible through an aperture 28 in the center of the control plate 20.

A drive side bearing flange 30 threads into the internal threads 66 of the aperture 69 of the bottom bracket shell subassembly 60 and sandwiches the control plate 20 against the bottom bracket shell subassembly 60 and holds the control plate 20 concentric to the bottom bracket shell subassembly 60. In general, the drive side bearing flange 30 is also used to support a spindle bearing (not shown). There is generally a bearing at each end of the bottom bracket shell subassembly 60 to rotatably support the spindle. The spindle is provided with pedal cranks (also not shown) at each end and all rotate en masse with the two cranks when the rider pedals the bicycle.

The drive side bearing flange 30 is common to most bikes and in the case of this invention serves the additional purpose of holding the control plate 20 against the bottom bracket shell subassembly 60 and of holding the control plate 20 concentric to bottom bracket shell subassembly 60. In addition, the sandwich effect between the drive side bearing flange 30 and bottom bracket shell subassembly 60 serves to hold the control plate 20 so that the control plate 20 is substantially perpendicular to the axis or rotation of the spindle.

It is preferable to prevent the control plate 20 from rotating forward in reaction to sun gear forces transmitted to it from a control pawl 13. A torque fix feature is shown in FIG. 1. The torque fix feature is preferably integral with the control plate 20 or alternatively fixed with a fastener such as a bolt. In this way multiple positions of a torque fix feature are provided to accommodate the exact locations of the chain stay tubes 64 on various frames if desired. However, the exact angle is not important. What is important is that the control plate 20 is rigidly fixed to the bicycle frame so that sun gear and other incidental forces are transferred to the bicycle frame without significant flexion or movement of the control plate 20 relative to the bicycle frame. With this in mind, a contact angle that is generally perpendicular to the control plate 20 is preferred. In this way, large torsional forces are transferred from the control plate 20 to the bicycle frame without distortion of the substantially perpendicular relationship between the control plate 20 and a spindle axis.

When a planetary system is used in the one to one gear ratio, a sun gear is free to rotate with the gearing "en masse". In this case there are no forces transmitted from the sun gear to the control pawl 13 and on to the control plate 20 or from the control plate 20 to the bicycle frame.

When the planetary system is used in "overdrive" the gearing is active and the sun gear is blocked by the control pawl 13. The sun gear blocking force is indicated as "sun gear force" 28 in FIG. 1. The blocking force is transferred from the sun gear to the control pawl 13, from there to the control plate 20, and finally to the bicycle frame. The blocking force is in the forward rotation direction. No significant force needs to be transferred in the reverse direction because the control pawl 13 permits the sun gear to freewheel in the reverse direction. Therefore there is no significant need for a second torque feature to transfer a rearward force to the bicycle frame. The inherent friction between the drive side bearing flange 30 and bottom bracket shell subassembly 60 are adequate to prevent rotation of the control plate 20 in the reverse direction.

The present invention uses this arrangement to keep the structure of the mounting system extremely simple. By using only one contact surface to prevent forward rotation, the present invention can be configured to accommodate a variety of chain stay diameters and angles with one simple design.

Figure 2:
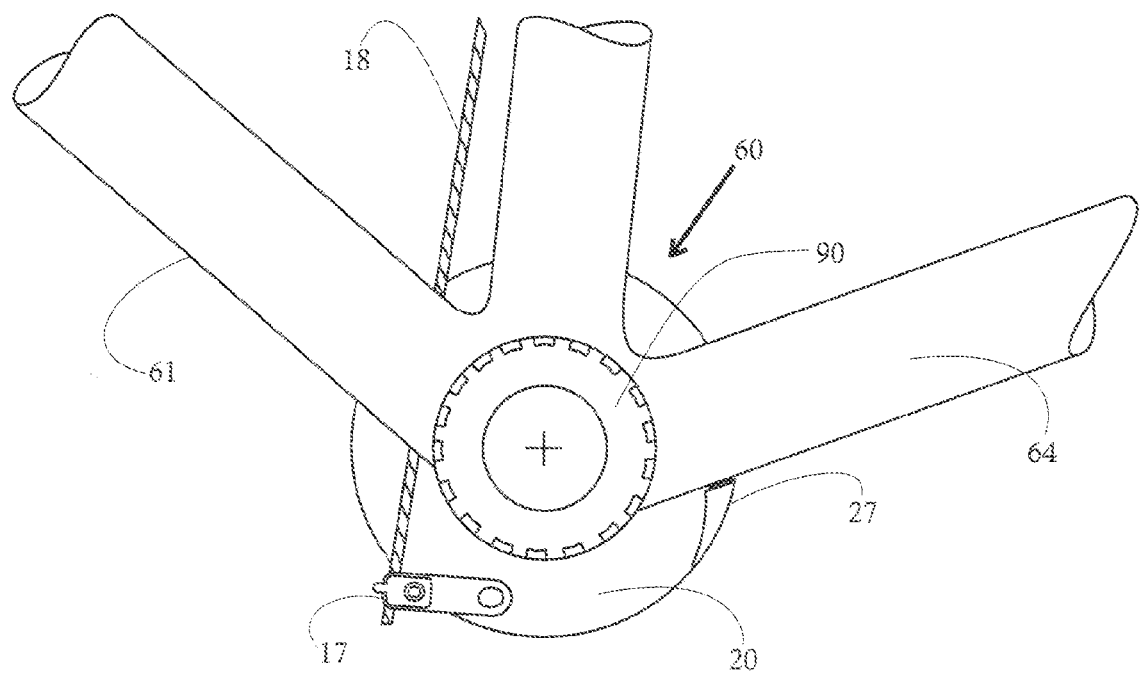
FIG. 2 is an inboard side view of a preferred embodiment of a bottom bracket mounting system for bicycle.

FIG. 2 shows a view of the mounting system from the non drive end of the bottom bracket shell subassembly 60. The torque fix feature 27 is shown positioned against the bottom surface of the (drive side) chain stay 64. The non drive side bearing flange subassembly 90 is shown mounted to the bottom bracket shell subassembly 60. The non drive side bearing flange subassembly 90 is commonly threaded into internal threads 66 cut into the inside diameter of the bottom bracket shell subassembly 60. Alternatively non drive side bearing flange subassembly 90 extends through the bottom bracket shell subassembly 60 and threads directly into threads cut into the drive side bearing flange 30. This arrangement alleviates the need to separately screw the drive side bearing flange 30 into the bottom bracket shell subassembly 60. Thus assembly time at a bicycle assembly factory is reduced. In this configuration, the drive side bearing flange 30 is rotationally keyed to or integral with the control plate 20. The non drive side bearing flange 90 is torqued to the control plate 20 thus sandwiching the bottom bracket shell subassembly 60 in one assembly step.

FIG. 2 also shows the control pawl control input and control cable 18. The control input is preferably biased by means of a spring (not shown) in order to keep tension on the control cable 18.

Figure 3:
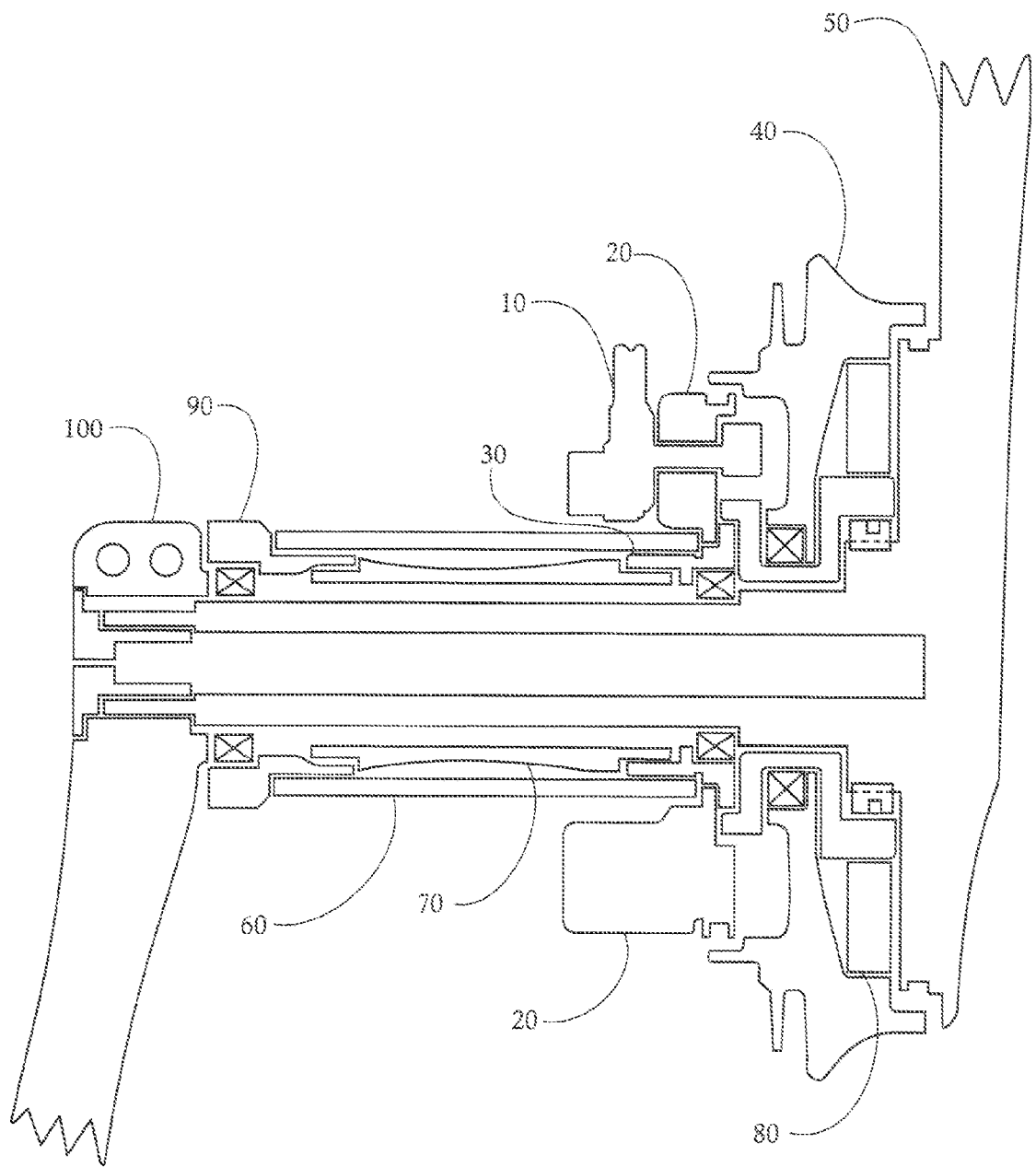
FIG. 3 is a cross-sectional view of a bottom bracket mounting system for bicycle.
Figure 4:
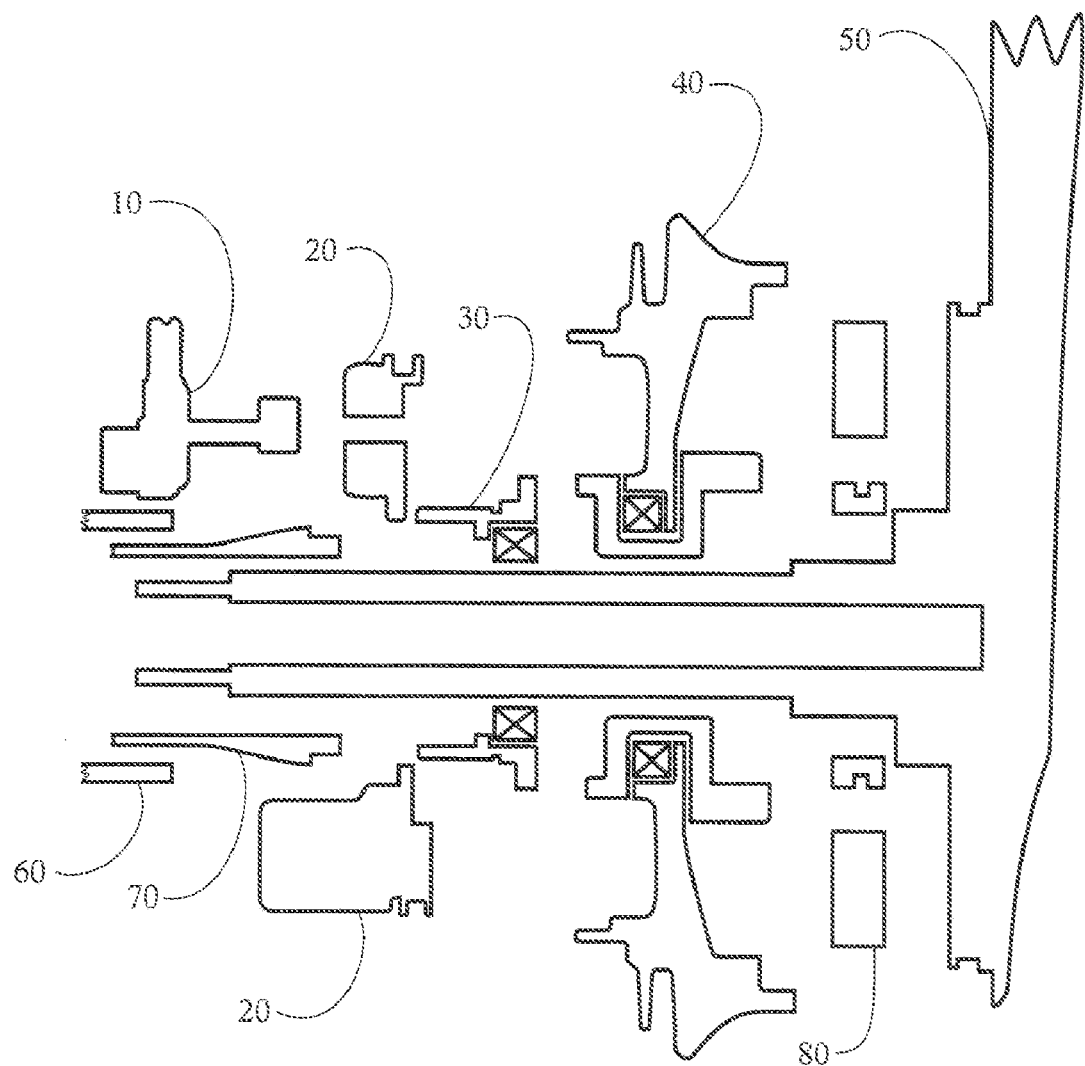
FIG. 4 is an exploded cross-sectional view of a bottom bracket mounting system for bicycle.

Components of the present invention are shown in FIGS. 3 and 4. The components include a control rod subassembly 10, a control plate subassembly 20, a drive side bearing flange subassembly 30, a ring gear subassembly 40, a crank arm subassembly 50, a bottom bracket shell subassembly 60, a bearing flange connector tube 70, a planet gear subassembly 80, a non-drive side bearing flange subassembly 90 and a non drive side crank subassembly 100.

The bottom bracket planetary systems disclosed in patent applications by the same inventor referenced above, do not require a precise parallelism between the control plate 20 and the rotating gearing. Therefore this mounting system can be used without special preparation or machining of the outside surface of the bottom bracket shell subassembly 60. The structure of these planetary systems is such that the rotating ring gear 40 is not supported by a bearing mounted on the control plate 20. If this were so, a more precise relationship would be required. The mounting system of the present invention takes advantage of the tolerance of the planetary systems described herein by reference. There is a seal between the control plate 20 and a ring gear shell subassembly 40, but the seal is compliant and can tolerate rotational runout. This is especially true when the seals are radial with a gland facing a smooth surface to permit the seal element to find its own track on the smooth facing part.

Figure 5:
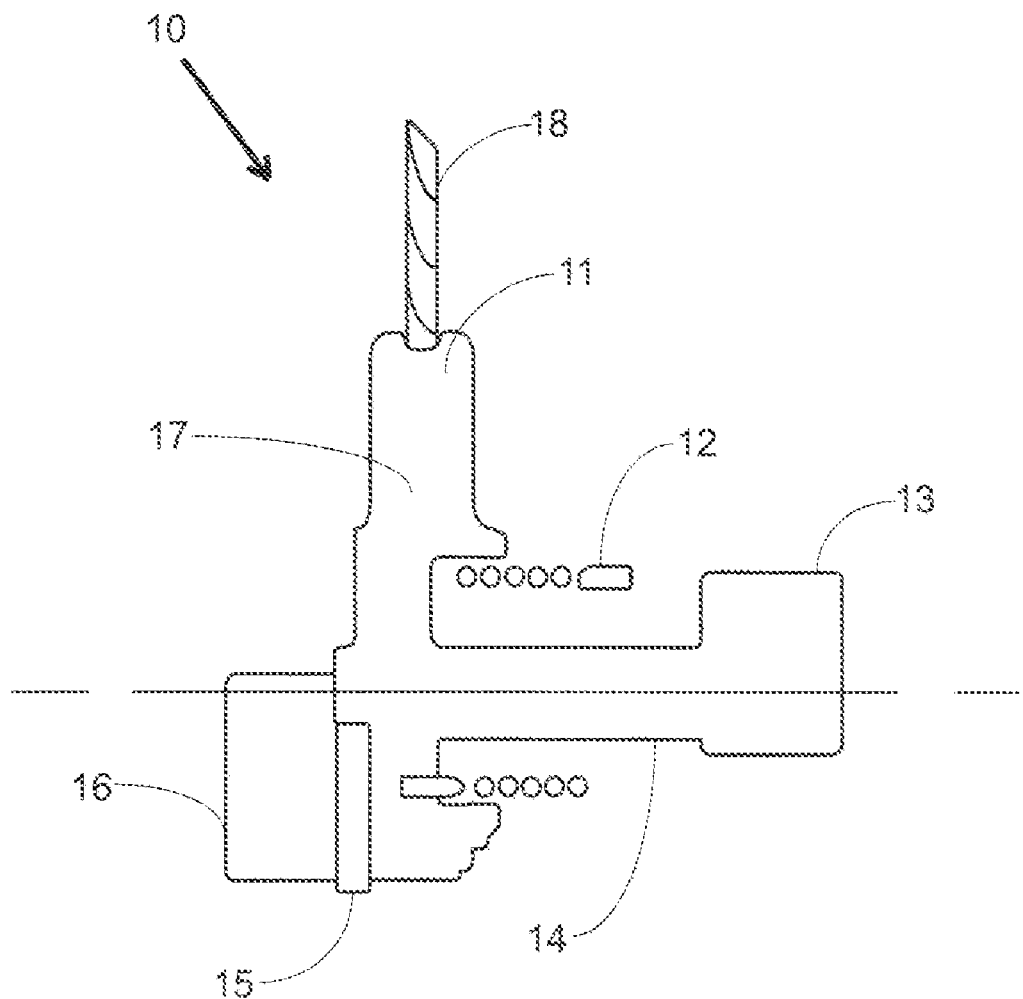
FIG. 5 is a top plan view of a control rod subassembly of a bottom bracket mounting system for bicycle.

A control rod subassembly is shown in FIG. 5. The control rod subassembly 10 translates control cable displacement originating from a handlebar mounted shifter into movement of the control pawl 13. The control cable 18 is fastened to a bellcrank 17 using a cable clamp 16. The control cable 18 wraps around the bellcrank 17 in the cable entrainment portion 11 in a spooling fashion. Control cable displacement rotates a control rod 14 about its axis of rotation. A simple pawl 13, articulated pawl, or control cam are fastened to the end of the control rod 14 opposite the control cable clamp 16 and bellcrank 17. A simple pawl 13 as illustrated in FIG. 1 is employed to block sun gear rotation or the rotation of a planet carrier or ring gear to change the output ratio of the planetary system. The simple pawl 13 is engaged to apply blocking forces while the planetary system is under driving loads, but cannot be disengaged easily or safely under load. For this reason a novel articulated or compound pawl can be used. The function of this articulated pawl is disclosed in a previous patent application by the same inventor. The simple or articulated pawl 13 can be actuated by being mounted directly onto the control rod 14 or indirectly by means of a cam which is mounted directly to the control rod 14. In this case the pawl pivots on a stationary pivot mounted on the control plate 20.

The cable entrainment portion 11 ensures that the control cable 18 winds onto the control rod bellcrank 17 in a spooling fashion at a controlled radius for predictable mechanical advantage.

The control rod return spring 12 keeps tension on the control cable 18 when the handlebar actuator or shifter releases the control cable 18.

The control pawl 13 (may be simple pawl or articulated for shifting under load) is the element that applies the blocking forces to an element of the planetary gear system.

The control rod 14 transmits the rotation of the cable clamp and bellcrank 17 to the control pawl 13 or control cam.

The cable clamp washer 15 prevents rotation of the cable clamp bolt 16 from fraying the control cable 18 when the cable clamp bolt 16 is tightened.

The cable clamp bolt 16 secures the control cable to the bellcrank 17.

The bellcrank 17 is a partial spool that the control cable 18 winds on when the control rod return spring 24 biases the bellcrank 17 in the cable take-up direction.

Figure 6:
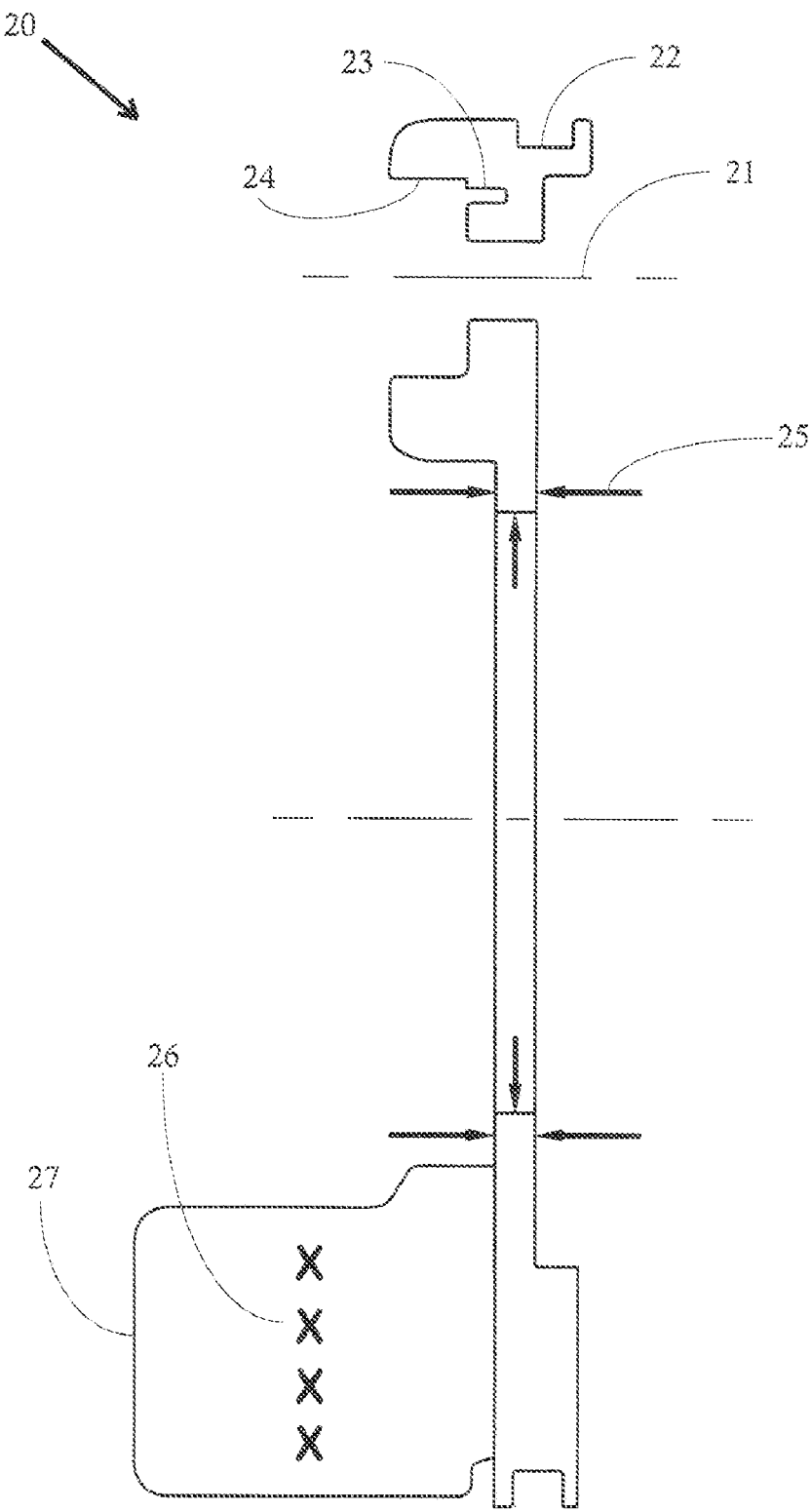
FIG. 6 is an isolated view of a control plate subassembly of a bottom bracket mounting system for bicycle.

A control plate subassembly 20 is shown in isolation in FIG. 6. The control plate subassembly 20 is secured to the bicycle frame 5 by being sandwiched between the bottom bracket shell subassembly 60 and the drive side bearing flange 30 at its inside diameter and is further secured by a torque fix feature that prevents rotation in the driving direction. The control plate subassembly 20 holds the control rod subassembly 10 in the proper relationship to a ratchet wheel 1050 which in turn is connected to the sun gear or other element of the planetary system. When the ratchet wheel 1050 is blocked, the blocking forces are transferred to the bicycle frame 5 through the control plate subassembly 20.

The control rod bushing axis 21 is the axis of rotation of the control rod 14.

The seal gland 22 holds an elastomeric seal (not shown) against the sealing surface on the ring gear shell.

The control rod return spring tang receiver 23 secures the stationary end of the return spring so it can bias the control rod 14.

The control rod return spring housing 24 contains the spring so it can be sealed from contamination.

The arrows 25 denote axial and radial contact forces. These forces hold the control plate 20 in position axially and radially.

Xs 26 denote tangential contact forces. The tangential forces prevent the control plate 20 from rotating in the driving direction. The tangential forces are substantially normal contact forces and can be applied to any convenient feature integral with the bottom bracket shell subassembly 60 with no further fastening means. This drastically simplifies the installation procedure and also increases the variety of bicycle frames to which the planetary system can be easily installed. For example, it is not necessary to fasten a strap around a frame member to secure the planetary system.

Figure 7:
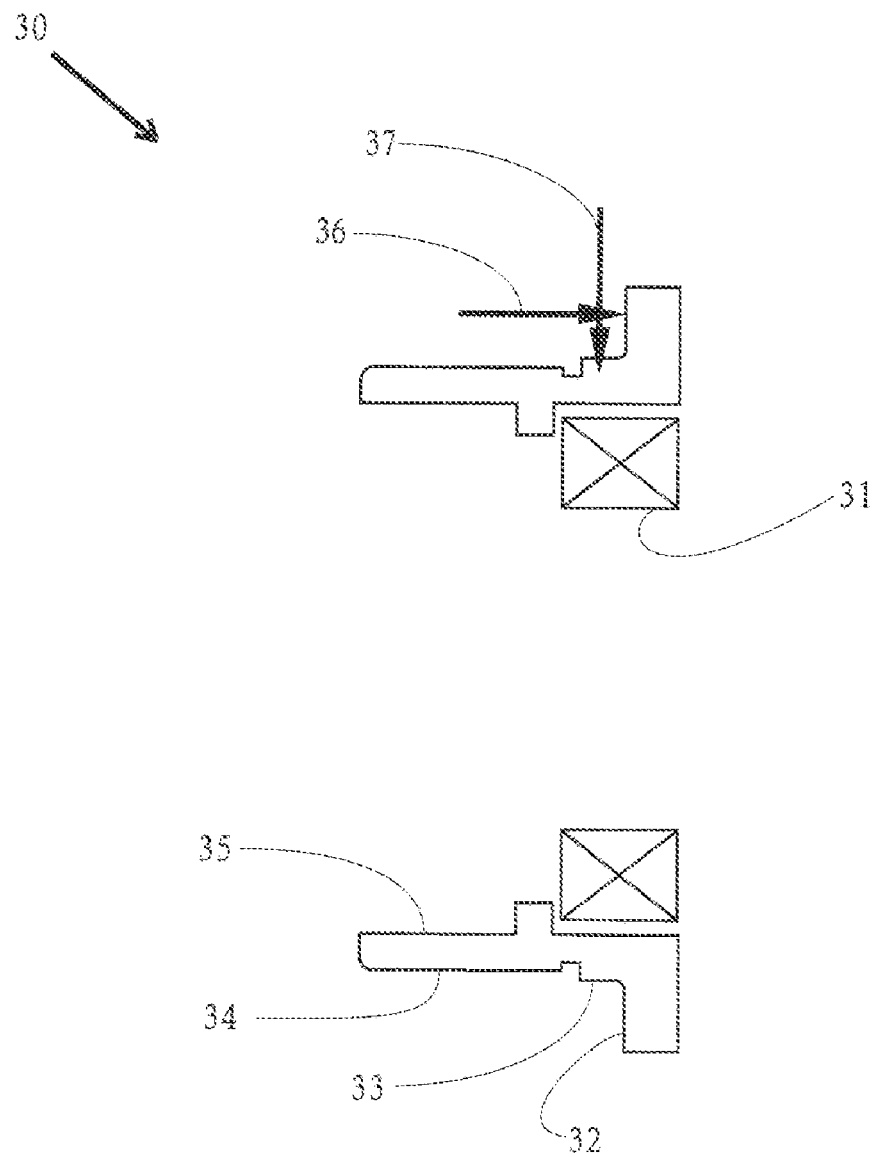
FIG. 7 is an isolated view of a drive side bearing flange subassembly of a bottom bracket mounting system for bicycle.

The drive side bearing flange subassembly 30 is shown in FIG. 7 and includes the inner and outer bearing races of the drive side spindle bearing 31. The drive side bearing flange subassembly 30 threads into the bottom bracket shell subassembly 60 directly or can be pressed or slip fitted into the bottom bracket shell subassembly 60.

The drive side spindle bearing 31 rotatably supports the spindle 52 in the bottom bracket shell subassembly 60. The outer bearing race can be integral with the drive side bearing flange subassembly 30. The inner race has a smooth bore inside diameter so that the spindle 52 can be assembled by insertion after the bearing is mounted to the bottom bracket shell subassembly 60. This drastically simplifies the installation of the planetary system since the control plate subassembly 20 and drive side bearing flange subassembly can be installed as a first step which is axially self referencing in the sense that the exact axial stackup does not matter . . . and then the rest of the planetary system which is supported on the spindle 52 can be simply slided in up to a shoulder on the spindle 52. The shoulder comes to rest against the outboard face of the drive side spindle bearing inner race. In this way the entire assembly is self referencing with respect to the axial spacing of the parts. This arrangement alleviates the need to be concerned about the axial placement of any bicycle frame features such as ISCG tabs, or the axial draw up of a drive side crank arm as it is drawn onto a tapered fit spindle end. The present system is employs a spindle 52 and drive side crank 50 that are preassembled at the factory in exact relationship to the axial spacing shoulder integral with the spindle. Therefore the OEM or bicycle shop mechanic can ignore any concerns about axial spacing. For example, there is no need to reface ISCG tabs or reface the bottom bracket shell subassembly 60 or any other frame feature.

The inboard face 32 of the drive side bearing flange subassembly 30 is the surface which contacts the control plate 20 with axial forces.

The shoulder 33 of the drive side bearing flange subassembly 30 is the surface of the drive side bearing flange subassembly 30 which contacts the control plate 20 with radial forces.

The portion 34 of the drive side bearing flange subassembly 30 which is threaded, pressed, or slip fitted into the bottom bracket shell subassembly 60.

The portion 35 of the drive side bearing flange subassembly 30 which is threaded, pressed or slip fitted to a connector tube of the drive side bearing flange subassembly 30.

The axial contact forces 36 supporting control plate 20 hold the axial position of the control plate 20 and ensure substantial perpendicularity to the spindle 52. Exact perpendicularity is not necessary as there is some angular compliance at the pawl pivot and at the articulated pawl hinge.

The radial contact forces 37 supporting control plate. These forces hold the radial position of the control plate and ensure substantial concentricity to the spindle. Exact concentricity is not necessary as the exact center to center distance between the ratchet wheel and pawl pivot is not critical.

The drive side bearing flange castellations 38*a* are used to apply wrenching forces to threadingly install the drive side bearing flange subassembly 30 to the bottom bracket shell subassembly 60 or to a connector tube to the non drive side bearing flange subassembly 90. They are also used to rotationally secure the drive side bearing flange subassembly 30 to the control plate 20 after installation by means of a set screw.

There are preferably nineteen set screw holes 38*b* and eight castellations 38*a* so that wherever the drive side bearing flange subassembly 30 comes to rest after being threadingly torqued, there is a hole available to secure the drive side bearing flange subassembly 30.

The set screw 39 secures the drive side bearing flange subassembly 30 to prevent unscrewing from the bottom bracket shell subassembly 60 after installation.

Figure 8:
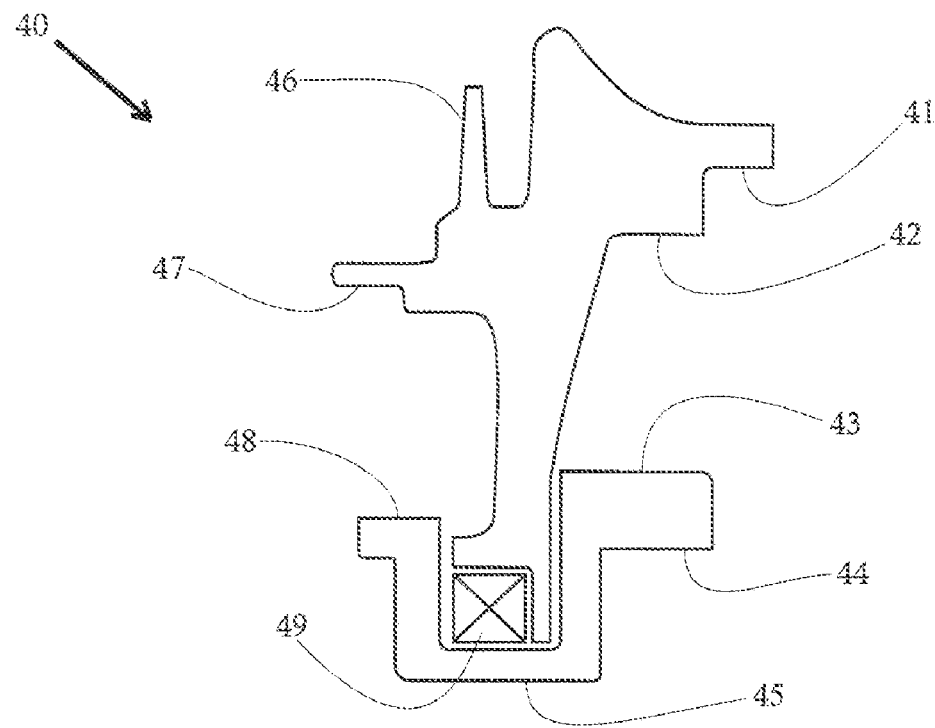
FIG. 8 is an isolated view of a ring gear subassembly of a bottom bracket mounting system for bicycle.
Figure 8:
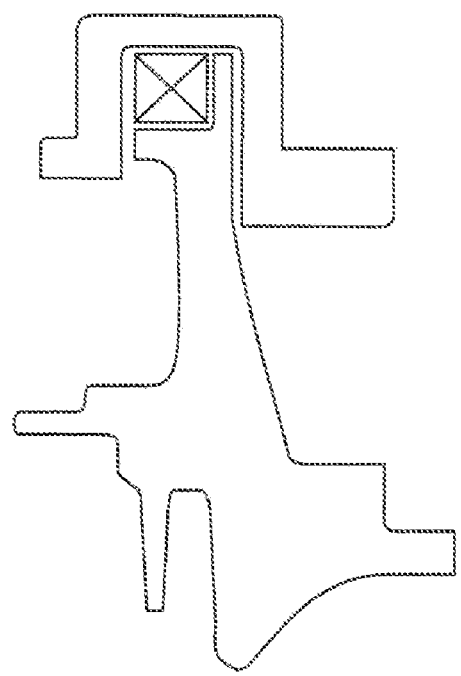

A ring gear subassembly 40 is shown in FIG. 8. The three main functions of the ring gear subassembly 40 are: 1) to rotatably support the ring gear on the spindle; 2) to transfer driving torque from the ring gear to the output sprocket; 3) to transfer blocking torque from the ratchet wheel to the sun gear.

The outboard seal surface 41 is the wiping surface of the seal between the crank arm 50 and the shell of the ring gear subassembly 40.

The ring gear teeth 42 mesh with the planet gear teeth 81.
The sun gear teeth 43 mesh with the planet gear teeth 81.

The sun gear ratchet teeth 44 are engaged to the crank pawls 57 during 1:1 operation.

A torque tube 45 connects a sun gear to a ratchet wheel 1050. The bushing 53 rotatably supports the torque tube 45 on the spindle 52.

The output sprocket 46 or pulley sheave transmits the driving motion to a drive chain or pulley.

The inboard seal surface 47 is wiped by the inboard seal between the control plate 20 and the shell of the ring gear subassembly 40.

The ratchet wheel teeth 48 are opposite the sun gear ratchet teeth 44.

The ring gear bearing 49 rotatably supports the shell of the ring gear subassembly 40 on the torque tube 45. The torque tube 45 in turn is rotatably supported on the spindle 52. The objective of this arrangement is to keep the ring gear bearing 49 as small as possible to reduce bearing friction. Prior art devices generally use the area near the spindle 52 for the control function. This, however, makes it necessary to support the ring gear subassembly 40 at its periphery using a much larger diameter bearing. Bearing friction goes up dramatically with bearing diameter.

Figure 9:
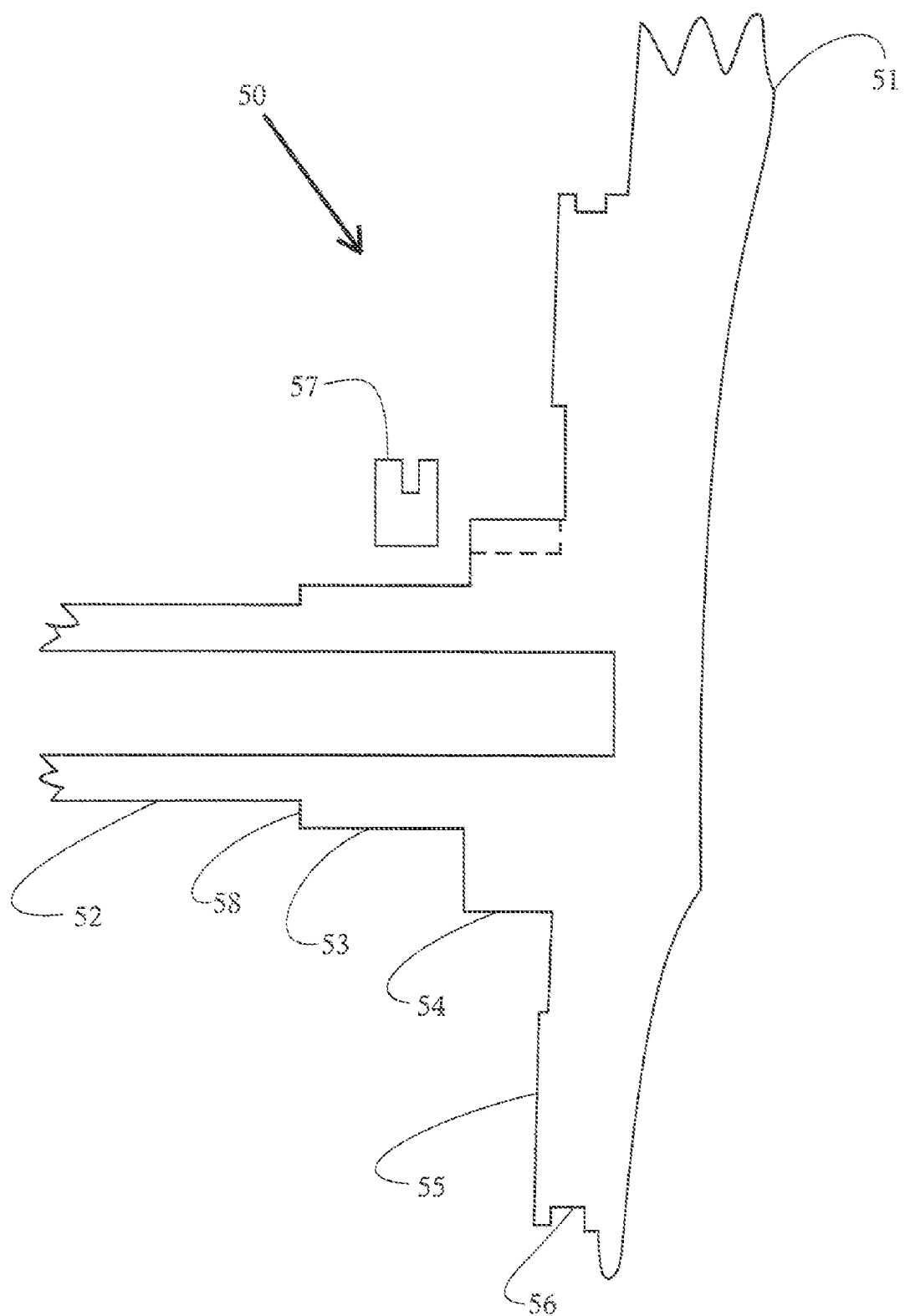
FIG. 9 is an isolated view of a crank arm subassembly of a bottom bracket mounting system for bicycle.

A crank arm subassembly 50 is shown in FIG. 9. The crank arm subassembly 50 transmits pedal forces to the planet gear subassembly 80. The crank arm subassembly 50 is rotatably supported in the bottom bracket shell subassembly 60 by means of bearings supporting the spindle 52. Multiple crank arm pawls 57 prevent the sun gear from rotating in the forward direction relative to the crank arm subassembly 50.

A pedal (not shown) is mounted to the end of the crank arm subassembly 50.

The spindle 52 is connected to the drive side and non drive side crank arms. The drive side crank is preferably fastened to the spindle 52 at the factory. The non drive side crank is slidingly assembled to the spindle 52, adjusted to take out axial play and clampingly fastened to the spindle 52. The entire transmission is held together axially by the spindle 52.

A bushing portion 53 of spindle 52 rotatably supports the torque tube 45.

1:1 pawl pocket portion 54 locate the 1:1 pawls 57 that prevent the sun gear from rotating in the forward direction relative to the crank arm subassembly 50.

A planet gear mounting portion 55 is where the planet gear axle bolts 83 are fastened.

A seal gland 56 for the outboard seal holds the seal between the crank arm subassembly 50 and the shell of ring gear subassembly 40.

The 1:1 pawls 57 prevent the sun gear from rotating forward relative to the crank arm subassembly 50 while permitting the sun gear to rotate in reverse relative to the crank arm subassembly 50.

A spindle shoulder 58 abuts the outboard face of the spindle bearing inner race. This feature controls the axial spacing of all the parts inside the planetary transmission and is preferably set at the factory. All that is necessary during assembly at a bicycle assembly factory or bicycle shop is to use the non drive side crank draw bolt to take out any axial play before clamping the non drive side crank to the spindle 52.

Figure 10:
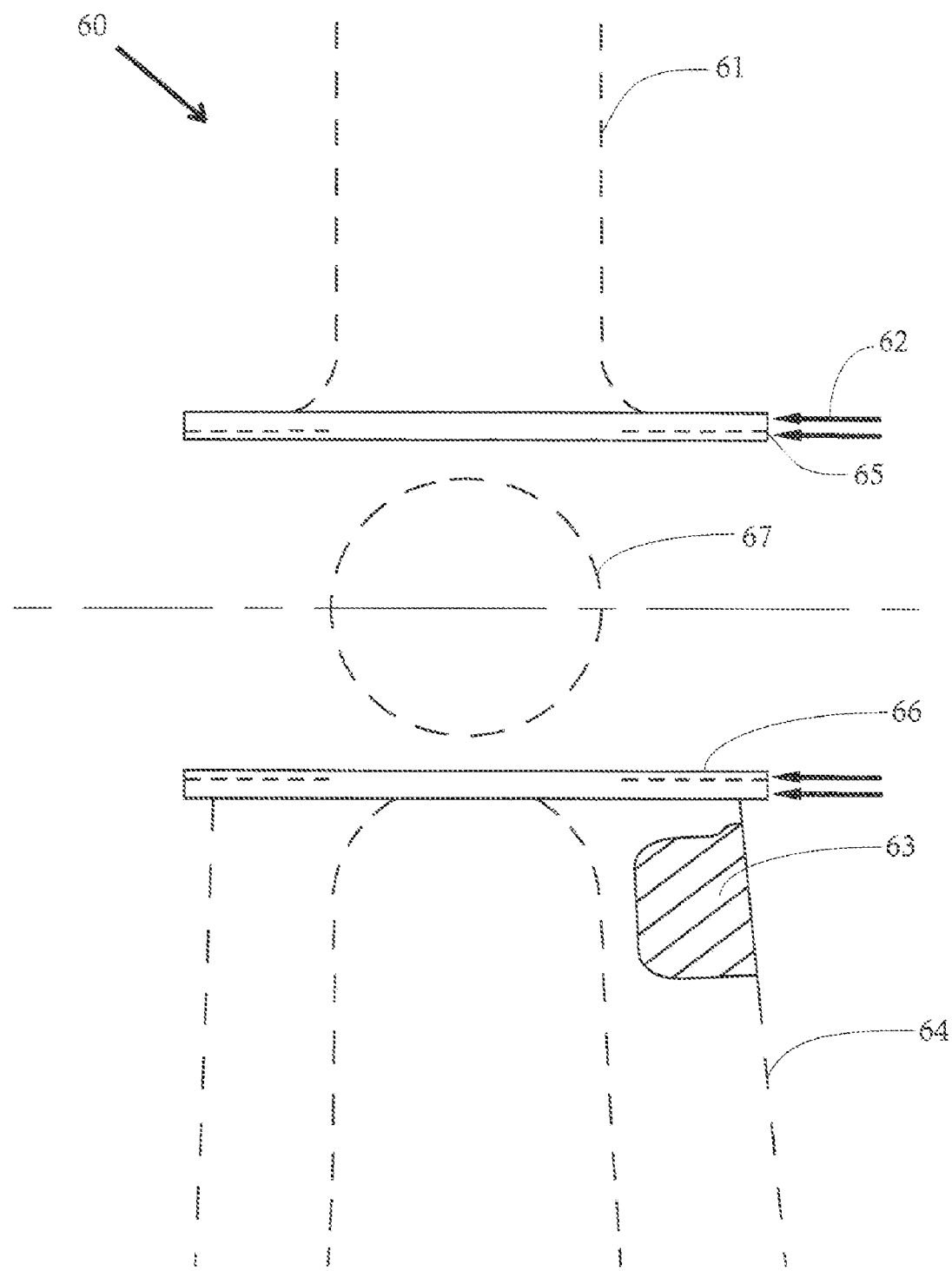
FIG. 10 is a top view of a bottom bracket shell subassembly for a bicycle.

A bottom bracket shell subassembly 60 is shown from a top view perspective in FIG. 10. A standard frame arrangement is shown, but the mounting method of the present invention is particularly flexible with respect to variations of this arrangement. All that is needed is a bottom bracket shell subassembly 60 with some integral or fixed feature that can react with the torque fix feature integral with the control subassembly. A down tube 61 connects the head tube to the bottom bracket shell subassembly 60.

The contact forces 62 to control plate 20 are the axial forces between the bottom bracket shell subassembly 60 and the control plate 20. These forces hold the control plate 20 axially relative to the frame 5 and perpendicularly relative to the spindle 52.

A contact area 63 under a chain stay 64 which contacts a control plate 20 torque fix feature. This is a convenient area of contact between the frame 5 and the torque fix feature integral with the control plate 20. This happens to be under the chain stay, but any frame member fixed relative to the bottom bracket will suffice. The contact forces are substantially normal contact forces and prevent rotation in the forward direction of the control plate 20 relative to the frame 5. Since the planetary transmission is inherently overrunning, no significant forces result in the reverse rotation direction. Therefore it is only necessary to use a single, simple, normal force contact.

A chain stay 64 is integral with the bottom bracket shell subassembly 60.

A contact area 65 to control plate 20 is where the control plate 20 contacts the bottom bracket shell subassembly 60.

Figure 11:
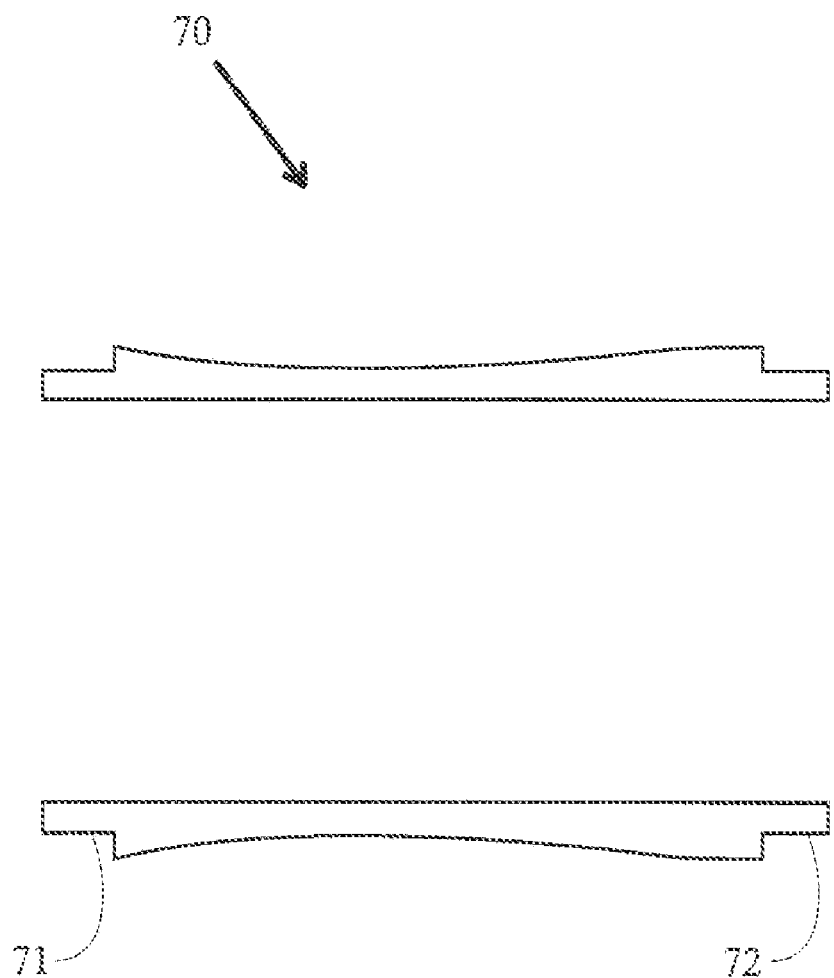
FIG. 11 is an isolated view of a bearing flange connector tube of a bottom bracket mounting system for bicycle.

As shown in FIG. 11, a bearing flange connector tube 70 keeps dirt and moisture away from the spindle 52 and spindle bearings. The bearing flange connector tube 70 can also be used structurally to hold the two spindle bearing flanges together. A portion 71 is fitted to the non drive side bearing flange 90 is preferably threaded, pressed or slip fitted with an O-ring. A portion 72 is fitted to the drive side bearing flange 30 is preferably threaded, pressed or slip fitted with an O-ring.

Figure 12:
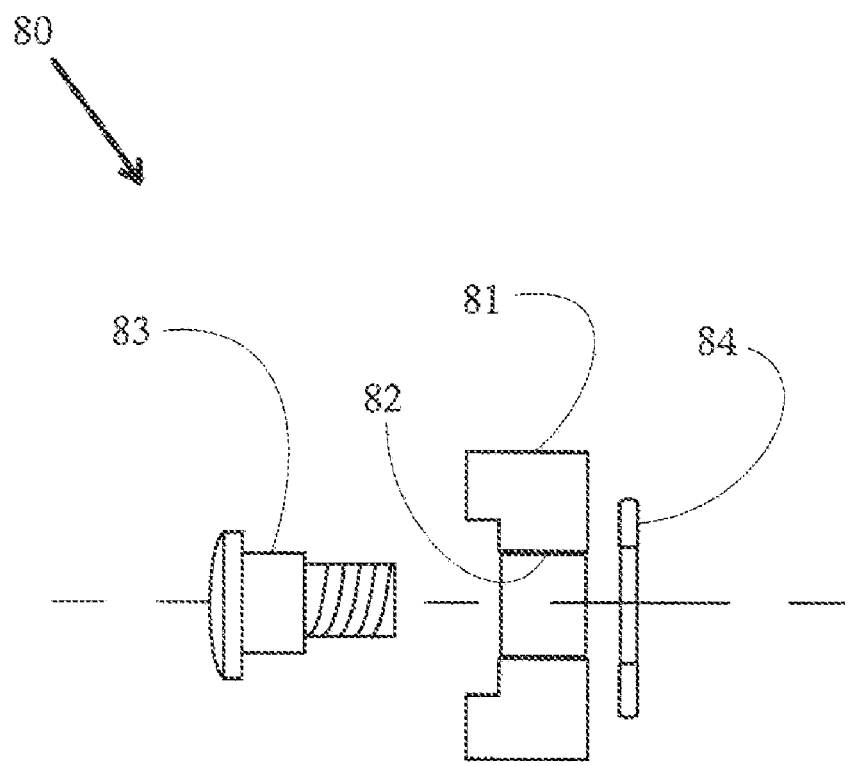
FIG. 12 is an isolated view of a planet gear subassembly of a bottom bracket mounting system for bicycle.

A planet gear subassembly 80 is shown in FIG. 12. The planet gear subassembly 80 is mounted to the crank arm subassembly 50. The planet gear teeth 81 mesh with the sun gear teeth 43 and the ring gear teeth 42. A planet gear bushing bore 82 allows for the planet gears to pivot on the planet axle bolts 83. The planet gear axle bolts 83 are left hand threaded to a planet carrier integral with the drive side crank arm of the crank arm subassembly 50. The planet gear spacer 84 keeps the planet gears from skiving the planet carrier.

The non drive side bearing flange subassembly 90 is shown in FIG. 3 and supports the spindle 52 on the non drive end of the bottom bracket shell subassembly 60. The non drive side bearing flange subassembly 90 can be integral with the outer bearing race. It can be threaded, pressed or slip fitted into the bottom bracket shell subassembly 60. The slip fits are possible because the non drive side crank is drawn up and clamped to the spindle. The arrangement is preferably all that is necessary to hold the entire transmission together. The inner race of the bearing is provided with a smooth bore so that axial play can be eliminated by sliding the spindle toward the non drive side until the shoulder integral with the spindle abuts the inner race of the drive side spindle bearing.

Figure 13:
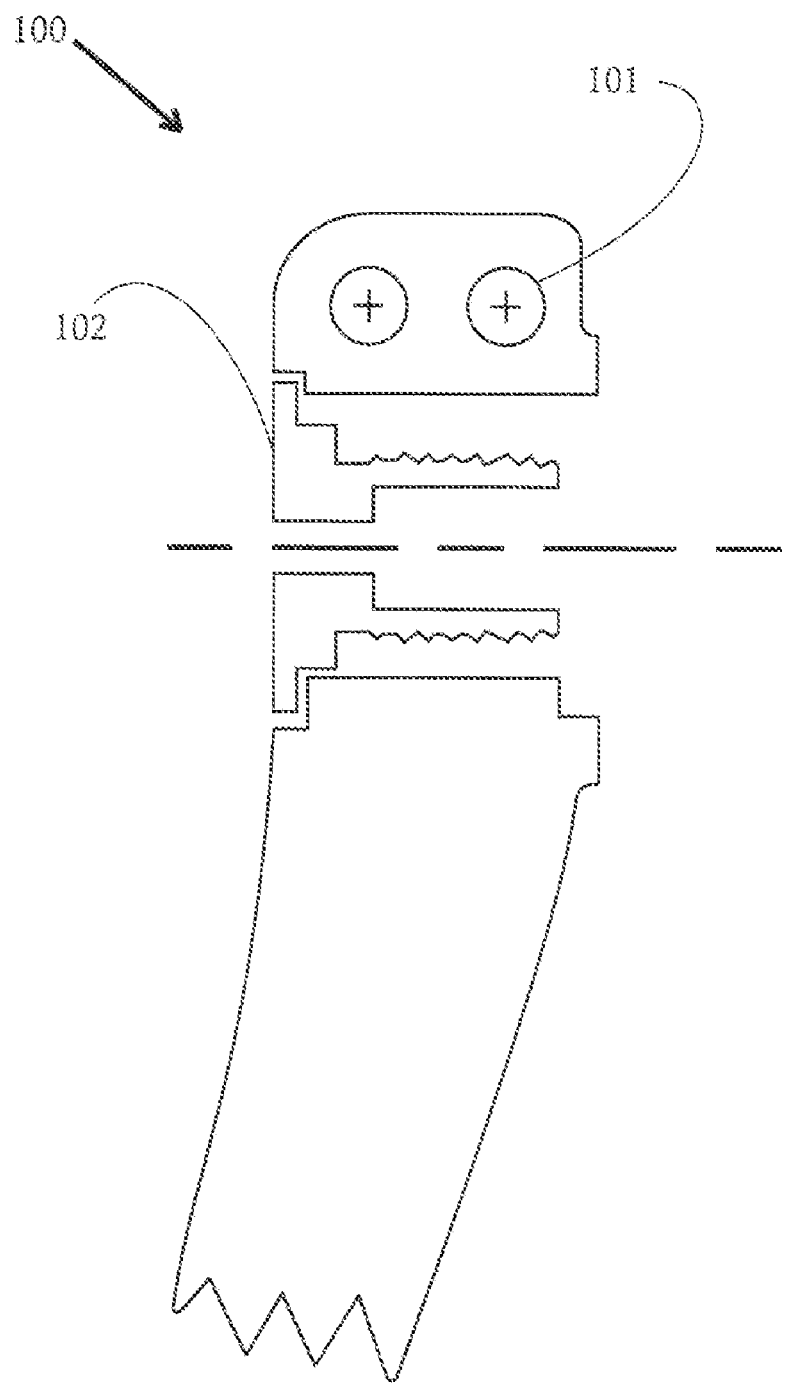
FIG. 13 is a side view of a non drive side crank subassembly of a bottom bracket mounting system for bicycle.

A non drive side crank subassembly 100 is shown in FIG. 13. The non drive side crank subassembly 100 is preferably a conventional arrangement with a two bolt spline clamp to the spindle 52 cooperating with an axial draw bolt 102 to first take out axial play. One or more crank clamp bolts 101 are used to clamp the crank arm subassembly 50 to the splines in the spindle 52. A crank axial draw up bolt 102 is used to take out any axial play before the crank arm subassembly 50 is clamped to the spindle 52.

Figure 14:
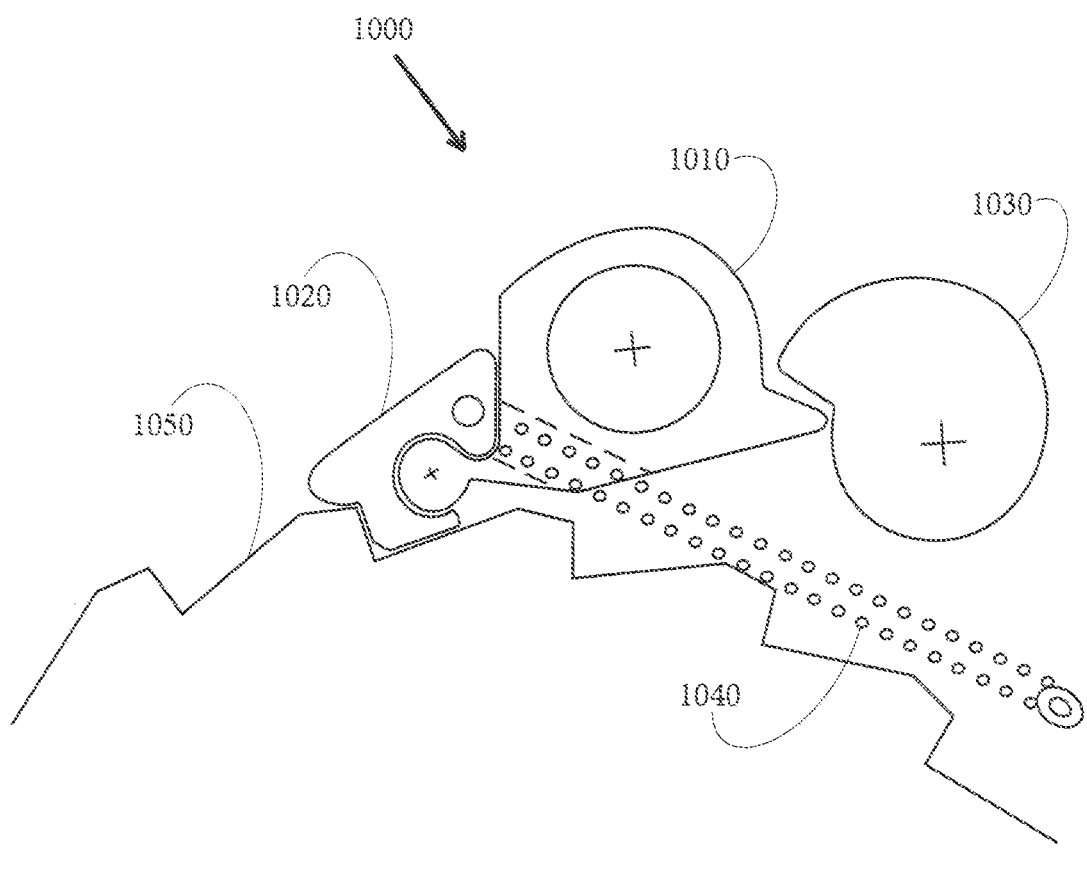
FIG. 14 is a side view of a load shiftable control pawl functional assembly of a bottom bracket mounting system for bicycle.

A load shiftable control pawl functional assembly 1000 is shown in FIG. 14. The load shiftable control pawl functional assembly 1000 is an alternative preferred embodiment of the control pawl 13 which enables unblocking the sun gear while the transmission is loaded with pedaling forces. A load shiftable control pawl base member 1010 pivots on the control rod 14 or on a stationary pivot bolt. A base member cam surface 1011 can be pushed on here to force the pawl out of engagement with the ratchet wheel 1050.

Figure 15:
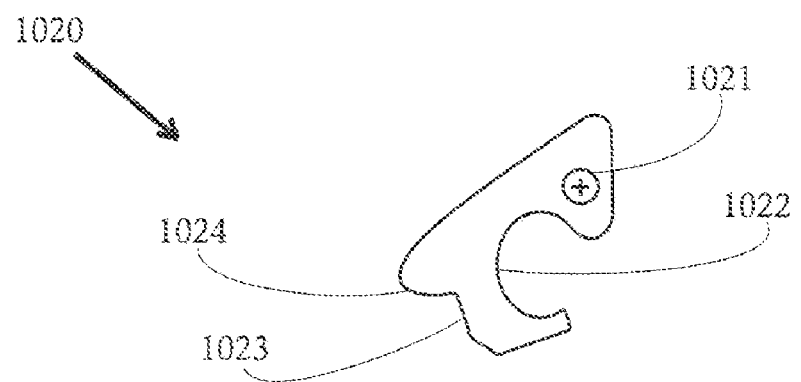
FIG. 15 is an exploded side view of a load shiftable control pawl functional assembly of a bottom bracket mounting system for bicycle.
Figure 15:
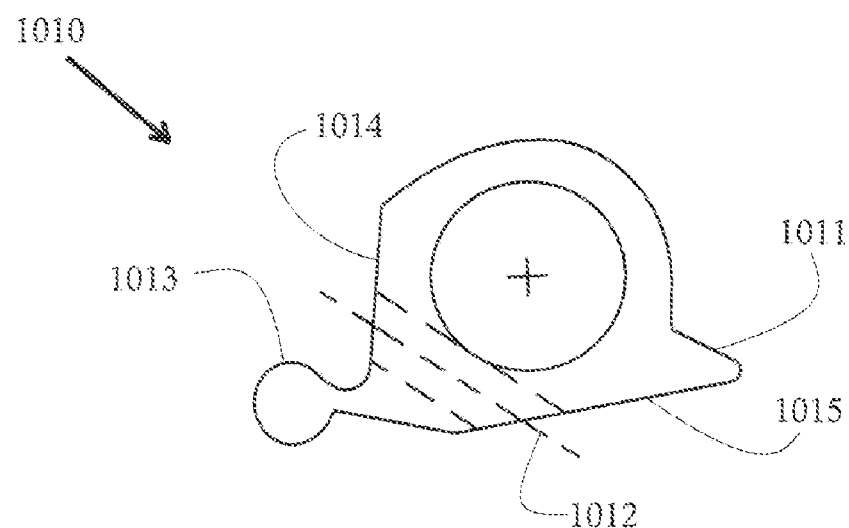
Figure 15:
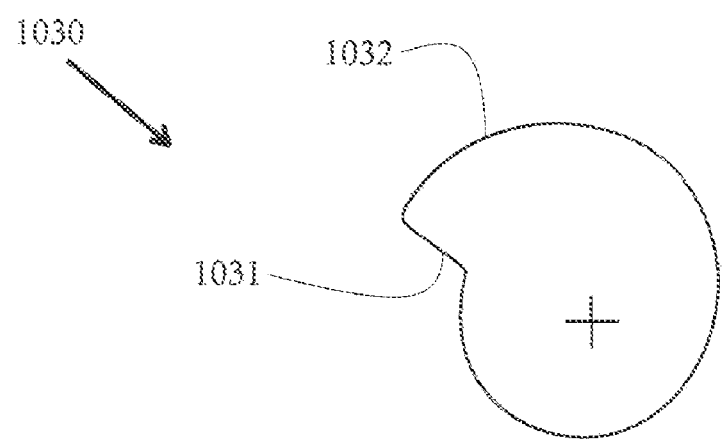

A base member return spring bore 1012 is shown in FIG. 15. A return spring biases the blocker in an overcenter position. The overcenter position enables the compound pawl to support stable columnar forces between a ratchet tooth and the pawl pivot bolt. Overcenter refers to the hinge pivot being past a line between the pawl pivot and the contact area to a ratchet tooth. When the pawl is forced out of engagement to effect a downshift to 1:1, the hinge pivot swings past this line and snaps out of engagement. The rolling motion of the blocker enables the action to be initiated with little effort compared to the blocking forces. Once the overcenter angle is reversed, the blocker snaps out of engagement and releases the ratchet wheel.

A base member hinge pintle 1013 fits like puzzle piece into the gudgeon 1022 of the load shiftable control pawl articulated blocker 1020. A base member hinge stop 1014 is where the load shiftable control pawl articulated blocker 1020 comes to rest to set the overcenter angle.

A base member foot 1015 is used by the load shiftable control pawl base member 1010 to rest on the back side of a ratchet tooth adjacent and "downstream" from the tooth that is being blocked by the load shiftable control pawl articulated blocker 1020. In this way, the hinge joint is prevented from being overstressed by the columnar loading.

The load shiftable control pawl articulated blocker 1020 is the business end of the articulated pawl. The load shiftable control pawl articulated blocker 1020 strikes and blocks the ratchet wheel 1050 to effect a shift to 1.6:1 and rolls out of engagement to release blocking to effect a downshift to 1:1. The use of a blocker return spring attachment pin bore 1021 in the load shiftable control pawl base member 1010 and a slot in the load shiftable control pawl articulated blocker 1020 enables the return spring itself to hold the hinge joint together axially. This enables the parts to be largely two dimensional so they are easy to fabricate and assemble with no additional fasteners. A blocker hinge gudgeon 1022 is the receiver that holds the base member hinge pintle 1013 to form the hinge.

A blocker contact to ratchet teeth portion 1023 is the actual business end of the load shiftable control pawl articulated blocker 1020 that prevents the ratchet wheel 1050 from rotating when blocked. A blocker roll off cam 1024 camming surface forces the blocker contact area 1023 to get out of the way as the ratchet wheel 1050 resumes rotating.

The control cam 1030 allows fine tuning of the mechanical advantage between the control rod rotation and blocker pawl rotation. The mechanical advantage is maximized when static friction forces need to be overcome to initiate disengagement during a downshift to 1:1. This is accomplished by shaping the cam to minimize the torque arm of the cam and maximize the torque arm of the load shiftable control pawl base member 1010 at the initiation of downshift. As the cam continues to rotate the situation is reversed to get load shiftable control pawl articulated blocker 1020 out of the way fast. Then finally the cam is shaped to permit further rotation of the cam with no resulting displacement of the load shiftable control pawl articulated blocker 1020. This allows the system to be compatible with substantially all shift levers or twist-grips. Any cable displacement in the typical range intended for use with a front derailleur will work well. This extra permitted rotation of the control rod with no additional movement of the load shiftable control pawl articulated blocker 1020 is important due to limited room inside the transmission for the load shiftable control pawl articulated blocker 1020 to swing once it is sufficiently disengaged from the ratchet wheel 1050.

When the control cable 18 is released to allow the load shiftable control pawl articulated blocker 1020 to fall back into engagement to the ratchet wheel 1050, it is important for the pawl to fall rapidly and get fully seated into an advancing ratchet tooth. Therefore, reversing the above process is advantageous in that it permits a precipitous release of the load shiftable control pawl articulated blocker 1020.

A control cam camming surface 1031 works against the load shiftable control pawl base member 1010 during a downshift.

A control cam base member prop portion 1032 props the load shiftable control pawl base member 1010 in a ready position but allows further rotation of the cam with no significant further rotation of the load shiftable control pawl base member 1010.

Figure 16:
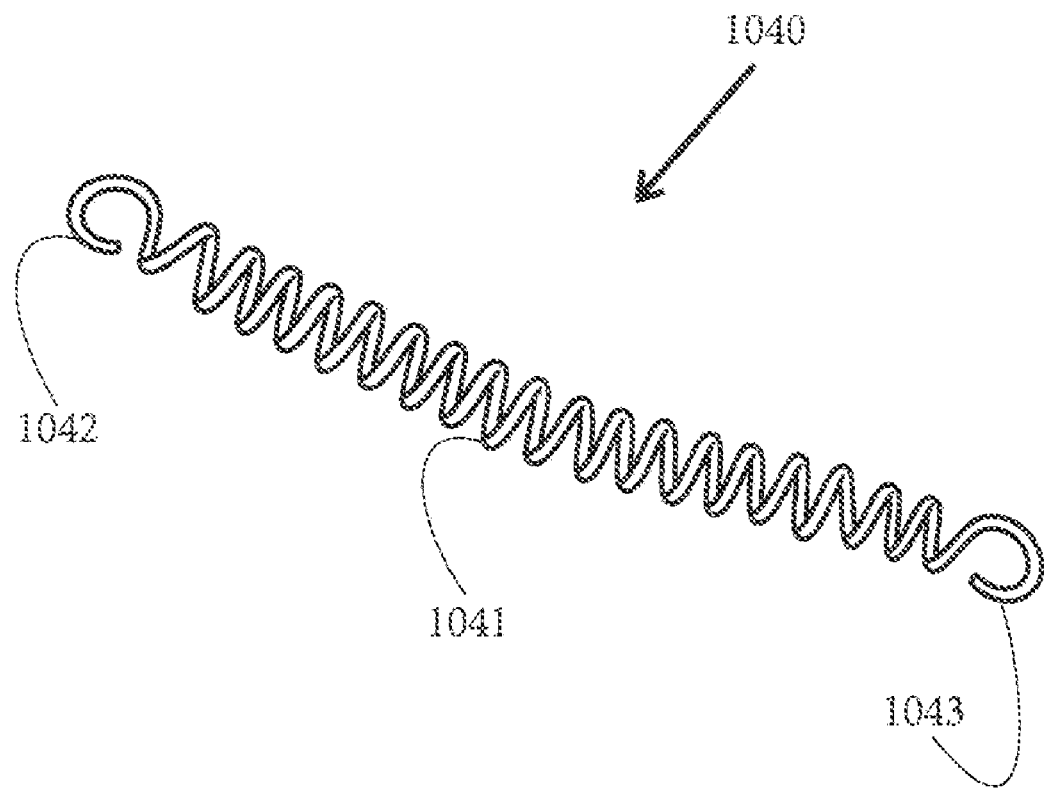
FIG. 16 is an isolated view of a load shiftable control pawl return spring of a bottom bracket mounting system for bicycle.

A load shiftable control pawl return spring 1040 is shown in FIG. 16. The load shiftable control pawl return spring 1040 biases the articulated pawl in the overcenter position and also biases the load shiftable control pawl base member 1010 toward the ratchet wheel 1050 as shown in FIG. 14. The load shiftable control pawl return spring 1040 also holds the hinge joint in position axially. A return spring coils 1041 is the elastic portion of the load shiftable control pawl return spring 1040. A return spring tang to blocker 1042 attaches to a roll pin (not shown) located in a bore in the load shiftable control pawl articulated blocker 1020. A return spring tang to control plate 1043 fixes the load shiftable control pawl return spring 1040 to the control plate 20.

Figure 17:
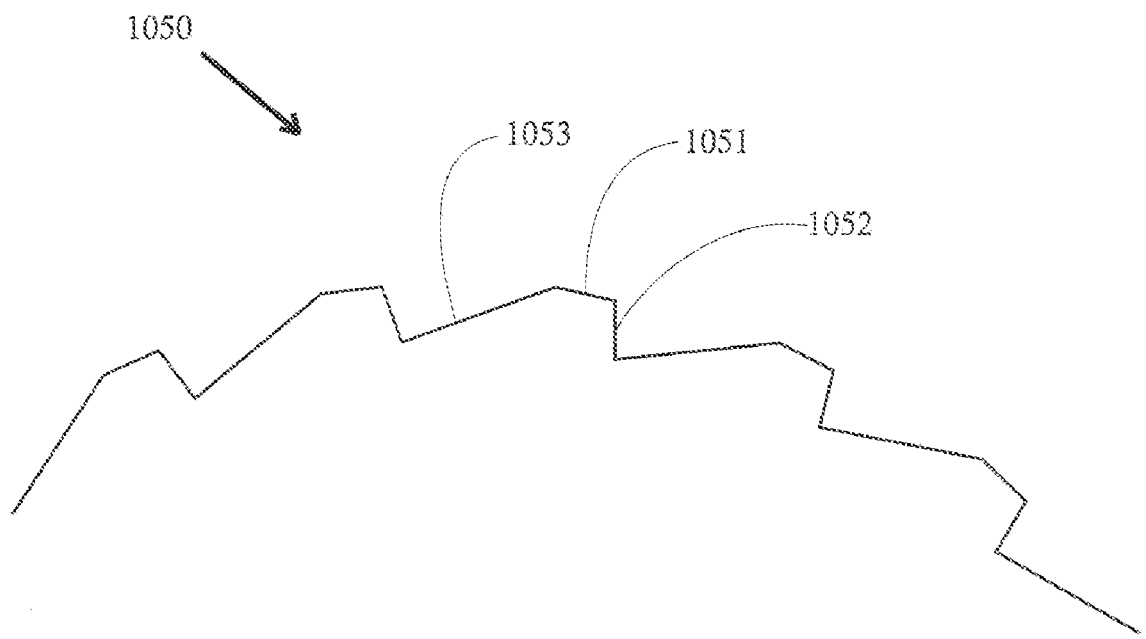
FIG. 17 is an isolated side view of a ratchet wheel of a bottom bracket mounting system for bicycle.
Figure 18:
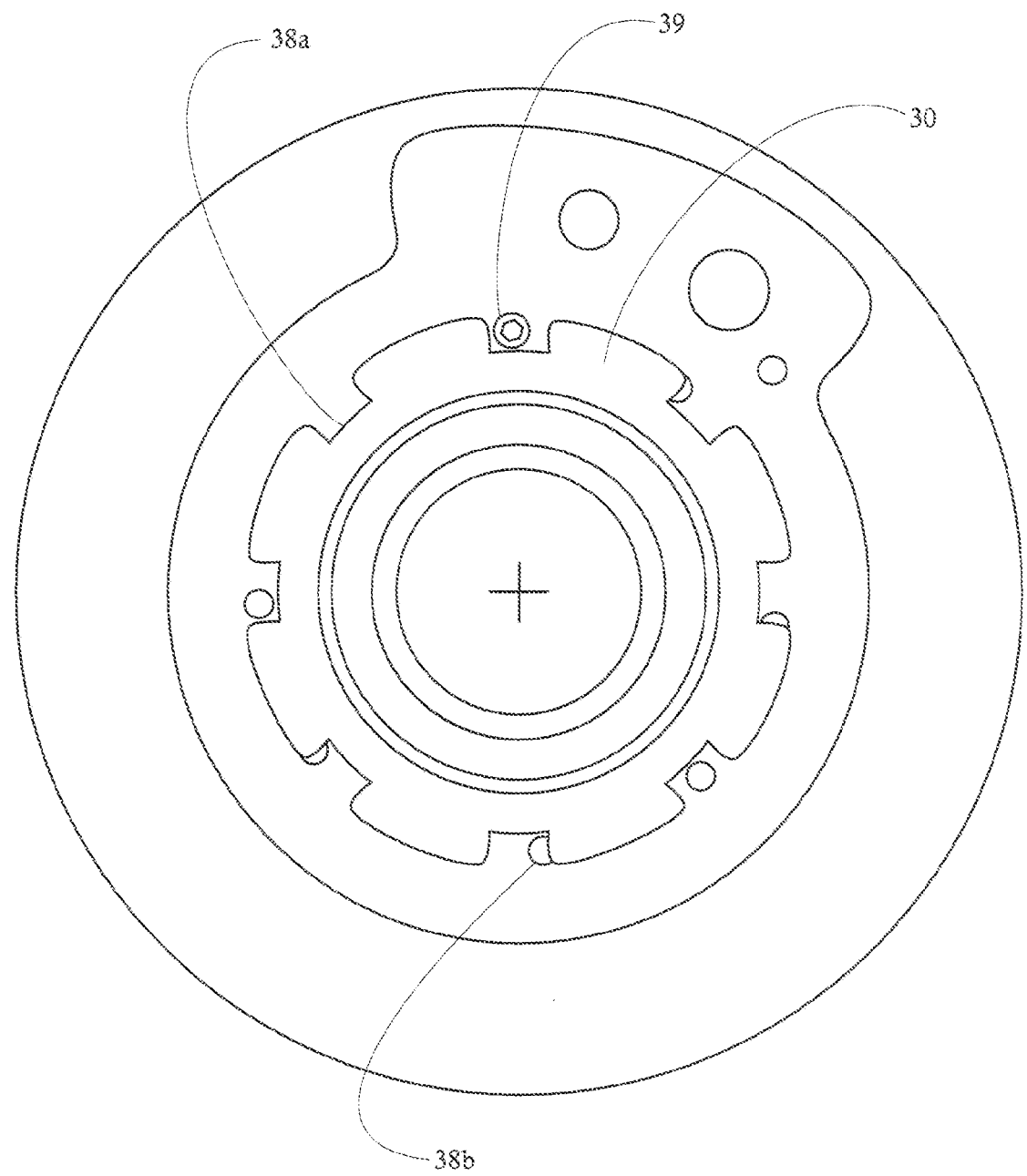
FIG. 18 is a side view of a drive side bearing flange subassembly of a bottom bracket mounting system for bicycle.

As shown in FIG. 17, the ratchet wheel 1050 is functionally integral with the sun gear or other planetary member. A ratchet tooth rolloff portion 1051 is where the load shiftable control pawl articulated blocker 1020 cams out of engagement. A ratchet tooth contact to blocker portion 1052 is the primary contact area for transmitting the tangential blocking forces that enable overdrive. A ratchet tooth back side 1053 is where the load shiftable control pawl base member 1010 rests to avoid overstressing the hinge joint.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A mounting device for a bicycle having a bottom bracket planetary gear system with a sun gear or ring gear, and a bottom bracket shell positioned at the convergence of a plurality of frame parts of a bicycle frame, the mounting device comprising:
    a control plate having a body comprising a central aperture, an annular wall, a first surface and a second surface, the annular wall having a torque fix feature for engaging one of the frame parts, the aperture extending through the body, the second surface mounted against the bottom bracket shell;
    a drive side bearing flange positioned through the central aperture of the body of the control plate and positioned through an aperture of the bottom bracket shell through a first opening of the aperture;
    a control subassembly comprising a control input element and a control pawl, the control input element extending through the body of the control plate wherein the control pawl is positioned on the first surface of the control plate, the control input element controlled by a control cable; and
    wherein the control pawl blocks the sun gear, ring gear or a planet carrier of the bottom bracket planetary gear system of the bicycle thereby transferring the sun gear, ring gear or planet carrier force to the control pawl then to the control plate and then to the bicycle frame through the torque feature.

2. The mounting device according to claim 1 wherein the control plate is composed of a material selected from stainless steel, titanium alloy, aluminum alloy, magnesium alloy and composite.

3. The mounting device according to claim 1 wherein the control plate has a thickness ranging from 0.100 inches to 0.300 inches and a diameter ranging from 2 inches to 5 inches.

4. The mounting device according to claim 1 further comprising a non-drive side bearing flange positioned through a second opening of the aperture of the bottom bracket shell assembly threaded into a plurality of threads of the drive side bearing flange.

5. The mounting device according to claim 1 wherein the plurality of frame parts of the frame comprises a chain stay and a seat tube.

6. The mounting device according to claim 1 wherein the plurality of frame parts of the frame comprises a chain stay, a down tube and a seat tube.

7. A bicycle having a bottom bracket planetary system, the bicycle comprising:
    a frame comprising a plurality of frame parts converging at a bottom bracket shell, the bottom bracket shell having an aperture with a first opening and a second opening;
    a gear comprising one of a sun gear, a planet gear or a ring gear;
    a ratchet wheel;
    a torque tube connecting one of the sun gear, the planet gear or the ring gear to the ratchet wheel;
    a control plate having a body comprising a central aperture, an annular wall, a first surface and a second surface, the annular wall having a torque fix feature for engaging one of the frame parts, the aperture extending through the body, the second surface mounted against the bottom bracket shell;
    a drive side bearing flange positioned through the central aperture of the body of the control plate and positioned through an aperture of the bottom bracket shell through a first opening of the aperture;
    a control subassembly comprising a control input element and a control pawl, the control input extending through the body of the control plate wherein the control pawl is positioned on the first surface of the control plate, the control input element controlled by a control cable; and
    wherein the control pawl blocks the sun gear, ring gear or planet carrier of the planetary system of the bicycle thereby transferring the sun gear, ring gear or planet carrier force to the control pawl then to the control plate and then to the bicycle frame.

8. The bicycle according to claim 7 wherein the control plate is composed of a material selected from stainless steel, titanium alloy, aluminum alloy, magnesium alloy and composite.

9. The bicycle according to claim 7 wherein the control plate has a thickness ranging from 0.100 inches to 0.300 inches and a diameter ranging from 2 inches to 5 inches.

10. The bicycle according to claim 7 further comprising a non-drive side bearing flange positioned through a second opening of the aperture of the bottom bracket shell assembly threaded into a plurality of threads of the drive side bearing flange.

11. The bicycle according to claim 7 further comprising a handlebar connected to the frame, the handlebar having an actuator, the control cable connected to the actuator of the handlebar.

12. A method for transferring blocking torque from a bicycle sun gear to a bicycle control mechanism and then to a bicycle frame; the method comprising:
blocking a gear with a control pawl of a mounting device mounted on a bottom bracket shell of the bicycle frame, the gear comprising one of a sun gear, a planet gear or a ring gear, the mounting device comprising a control plate, a torque fix feature for the bicycle frame, a control subassembly comprising a control input element and the control pawl, the control input extending through the control plate, a drive side bearing flange and a non-drive side bearing flange;
transferring a blocking force of the gear to the control pawl;
transferring the blocking force from the control pawl to the control plate; and
transferring the blocking force from the control plate to the bicycle frame through the torque fix feature.

13. The method according to claim 12 further comprising securing the control plate to the bicycle frame wherein the control plate is constrained to rotate about a bottom bracket spindle axis by means contact forces against the drive side spindle bearing flange and the bottom bracket shell, and constrained not to rotate about the spindle axis by means of contact forces against a feature integral with the bottom bracket shell, wherein the control plate supports the control input element for the control of a planetary mechanism rotatably mounted on the drive side spindle bearing flange, wherein the control element is used to block or unblock rotation of one of the sun gear, planet gear or ring gear, wherein the control input element is moveably mounted to an outboard face of the control plate and extends through the control plate to an inboard face of the control plate, wherein the control input element can be actuated by a control cable, rod, lever, hydraulic linkage, wired or wireless electromechanical linkage responding to a control input coming from the rider or from an automated controller such as a microprocessor.

14. The method according to claim 12 further comprising securing the control plate with an integral control mechanism for the control of a planetary gear box, wherein the control plate is held concentric and parallel to a planetary mechanism by means of axial and radial contact forces that exist in a first interface area that is essentially a body of revolution about a planetary axis, and wherein the control plate is prevented from rotating in the driving direction by means of tangential forces that exist in a second interface area that is essentially a plane which is parallel to the planetary axis and radially offset from it.

15. The method according to claim 12 further comprising securing the control plate with an integral control mechanism for the control of a planetary gear box concentric to a pedal spindle using no additional fasteners but only sandwiching the control plate between modified versions of existing parts, wherein the control plate is held concentric to and perpendicular to the pedal spindle by being sandwiched between the bottom bracket shell and the drive side bearing flange, and wherein the control plate is held from rotating in the driving direction by tangential forces between the control plate and one of the several features that normally exist as integral with the bottom bracket shell such as a chain stay, a seat tube, a down tube, or a rear suspension boss.

16. The mounting device according to claim 1 wherein the control plate is positioned between the drive side bearing flange and the bottom bracket shell, and wherein a gearing of the bottom bracket planetary gear system is freewheeling to permit the use of a single sided torque fix for the torque fix feature.

17. The mounting device according to claim 1 wherein a control input is by means of a rotating control element which rotates on an axis offset from a spindle axis so that a control input signal is transmitted through the control plate only by means of rotation and prevented from sliding.

18. The mounting device according to claim 1 wherein a crank arm, a gearbox, and a spindle are capable of sliding into bearings of the bottom bracket planetary gear system as a preassembled unit, and wherein a shoulder on processing the drive side spindle bearing flange sets the axial spacing by means of a shoulder on the spindle abuting the bearings of the bottom bracket planetary gear system.

19. The mounting device according to claim 1 wherein the ring gear is rotatably mounted on a spindle by means of a bearing system that is substantially in a plane of chain forces acting on a ring gear shell to avoiding cantilevered forces on bearings of the bottom bracket planetary gear system.

20. The mounting device according to claim 1 wherein a torque tube allows the control forces to perpendicularly pass through a plane of forces supporting a ring gear shell.

* * * * *